United States Patent
Wu et al.

(10) Patent No.: US 8,621,612 B2
(45) Date of Patent: Dec. 31, 2013

(54) CONTROL SYSTEM AND PROTECTION METHOD FOR INTEGRATED INFORMATION SECURITY SERVICES

(75) Inventors: I-Fang Wu, Taipei (TW); Jen-Hao Yao, Taipei (TW); Bing-Hung Du, Taipei (TW); Feng-Peng Yu, Taipei (TW); Wei Lee, Taipei (TW)

(73) Assignee: Chunghwa Telecom Co., Ltd., Taipei (TW)

( * ) Notice: Subject to any disclaimer, the term of this patent is extended or adjusted under 35 U.S.C. 154(b) by 726 days.

(21) Appl. No.: 12/407,287

(22) Filed: Mar. 19, 2009

(65) Prior Publication Data
US 2010/0122345 A1    May 13, 2010

(30) Foreign Application Priority Data
Nov. 7, 2008    (TW) ................. 97142988 A

(51) Int. Cl.
  *H04L 29/06*    (2006.01)
(52) U.S. Cl.
  USPC .......................................................... 726/22
(58) Field of Classification Search
  USPC .......................................................... 726/22
  See application file for complete search history.

(56) References Cited

U.S. PATENT DOCUMENTS

| | | | |
|---|---|---|---|
| 7,020,697 B1 * | 3/2006 | Goodman et al. | 709/223 |
| 2002/0095317 A1 * | 7/2002 | McCabe | 705/4 |
| 2002/0124213 A1 * | 9/2002 | Ahrens et al. | 714/57 |
| 2002/0138760 A1 * | 9/2002 | Naitoh | 713/201 |
| 2003/0018771 A1 * | 1/2003 | Vinberg | 709/223 |
| 2003/0120775 A1 * | 6/2003 | York | 709/224 |
| 2005/0108573 A1 * | 5/2005 | Bennett et al. | 713/201 |
| 2007/0192863 A1 * | 8/2007 | Kapoor et al. | 726/23 |
| 2007/0248090 A1 * | 10/2007 | Budhani et al. | 370/392 |

\* cited by examiner

*Primary Examiner* — William Goodchild

(57) ABSTRACT

A control system and protection method for integrated information security services are provided, which include protecting data packets of a user end device by a protecting device; generating an event log according to the protection result and transmitting the recorded event log to a collective control platform for standardizing and analyzing association by the collective control platform; detecting and transmitting abnormal information by the collective control platform to a service platform for integrating the information with network status information; displaying the integrated information on a webpage interface and transmitting the same to the user end device, thereby providing direct information on network security to save the high costs of purchasing, configuring and maintaining an information security protection system by the user.

25 Claims, 7 Drawing Sheets

CONTROL SYSTEM AND PROTECTION METHOD FOR INTEGRATED INFORMATION SECURITY SERVICES

FIELD OF THE INVENTION

The present invention relates to control systems and protection methods for integrated information security services, and more particularly, to a control system and protection method for integrated information security services by analyzing the event logs of information security devices.

BACKGROUND OF THE INVENTION

With the rapid development of network technologies, network systems are being constructed in a faster pace. With the widespread of the Internet, people conducting online daily activities is becoming a trend, for example, searching and browsing information, purchasing merchandises or making friends.

Users usually connect to the Internet through an ISP (Internet Service Provider). ISPs are companies or institutions that provide access to Internet and Internet services. These companies invest money to build connection control room and rent large amount of bandwidths, then distribute the bandwidths to individual users with a certain charge. Users normally connect to the Internet by dial-up or dedicated lines through servers provided by the ISPs.

However, there are a lot of malicious programs (or viruses) that may cause users' computers to malfunction, data lost or theft. Currently, users may purchase firewall software/hardware or install security devices in their local area network to stop intrusion of viruses. However, there are so many kinds of malicious programs, Internet users need to have many kinds of information security devices. The installation or maintenance of these devices is a large burden and sometimes not effective enough. In addition, even if malicious packets can be blocked out at the client side, the bandwidths may be occupied by the large amount of malicious packets. Moreover, logs of information security events generated by these information security devices are too cumbersome and complicated for ordinary users to understand what the problems are.

In summary, there is a need for a control system and protection method for integrated information security services that provides user-friendly information security protection with low cost.

SUMMARY OF THE INVENTION

In light of forgoing drawbacks, the present invention provides a control system and a protection method for integrated information security services, which provides integrated information of data security events and network status to allow users to quickly and readily keep track of various network status and data security information.

The control system for integrated information security services according to the present invention comprises: a user end device; a routing device for providing connection routing paths for the user end device; a protecting device for performing a information security service on data packets from the routing device and generating an event log based on the result of the information security service; a collective monitoring platform for extracting and collecting the event log, and performing association analysis on the event log to detect abnormal information; and a service platform for extracting the abnormal information and network status information, wherein the service platform displays the abnormal information and the network status information on a webpage interface, and sends the abnormal information to the user end device.

In a preferred aspect, the collective monitoring platform further includes: an event collecting device for collecting the event log and standardizing the event log; an event analyzing device for making the association analysis on the standardized event log, and providing functionalities for system functions setup, user setup, association analysis rules setup and interfacing with a maintenance platform; an event storage device for storing the event log and the result of the association analysis; and an event processing device for forming an event list based on the association analysis and classifying the events into levels.

The protection method for integrated information security services includes the following steps: (1) allowing a protecting device to protect data packets of user end devices, generate an event log, and send the event log to a collective monitoring platform; (2) allowing a collective monitoring platform to standardize the event log, and perform association analysis on the event log; (3) allowing the collective monitoring platform to detect abnormal information and send the abnormal information to a service platform; and (4) allowing the service platform to display the abnormal information and network status information on a webpage interface, and sends the abnormal information and the network status information to the user end device.

In a preferred aspect, the step (2) further includes the following steps: (2-1) allowing an event collecting device to collect and standardize the event log; and (2-2) allowing an event analyzing device to make the association analysis on the event log; (2-3) allowing an event storage device to store the event log and the result of the association analysis; and (2-4) allowing an event processing device to form an event list based on the association analysis and classify the events, and send informing message to a maintenance platform when a specific event occurs.

Compared to the prior art, the control system and protection method for integrated information security services according to the present invention determines the routing paths for data packets by utilizing the profile of a specific user end device, and data packets can be directed into the protecting device for data protection processes. Network viruses and malicious attack can be successfully blocked at the ISP side, while increasing utilizing efficiency of outbound network bandwidth. The collective monitoring platform is able to standardize the event log and make association analysis to detect abnormal information, and send this abnormal information to the service platform, which displays the abnormal information and network status information on the webpage interface, and also send the abnormal information to the user end device. In this way, users may readily and conveniently receive warnings about abnormal data security events and take actions accordingly. Furthermore, with the integrated notification of information security provided by the ISP, users do not need to install large amount of data protecting devices. It can significantly reduce installation, maintenance and personnel cost of information security.

BRIEF DESCRIPTION OF THE DRAWINGS

The present invention can be more fully understood by reading the following detailed description of the preferred embodiments, with reference made to the accompanying drawings, wherein:

FIG. 2 is a schematic diagram depicting an actual implementation of the control system for integrated information security services according to the present invention;

FIG. 3 is a flowchart illustrating a protection method for integrated information security services according to the present invention;

FIGS. 4-1 to 4-3 are flowcharts illustrating actual implementations of the protection method for integrated information security services according to the present invention;

DETAILED DESCRIPTION OF THE EMBODIMENTS

The present invention is described by the following specific embodiments. Those with ordinary skills in the art can readily understand the other advantages and functions of the present invention after reading the disclosure of this specification. The present invention can also be implemented with different embodiments. Various details described in this specification can be modified based on different viewpoints and applications without departing from the scope of the present invention.

Figure 1:
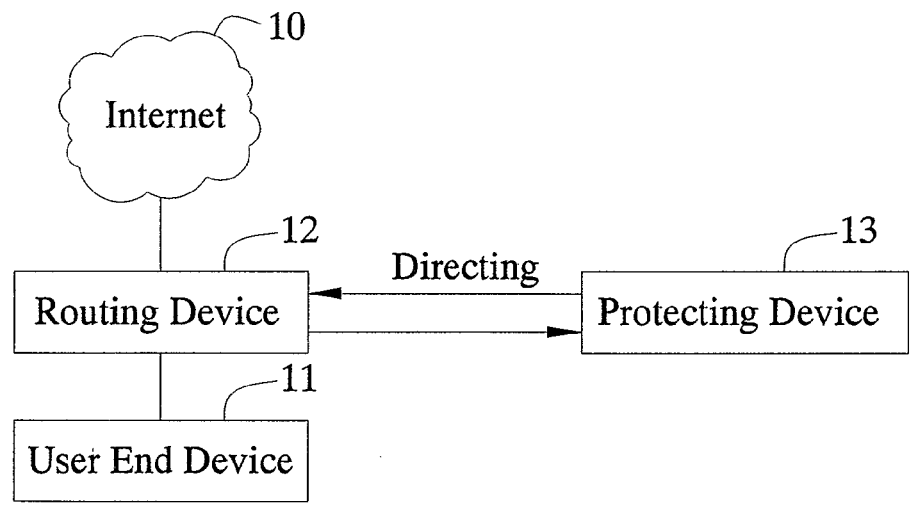
FIGS. 1-1 to 1-4 are schematic diagrams depicting a control system for integrated information security services according to the present invention.

Referring to FIGS. 1-1 to 1-4, block diagrams depicting a control system for integrated information security services according to the present invention are shown. In FIG. 1-1, the system includes the Internet 10, a user end device 11, a routing device 12 and a protecting device 13.

The user end device 11 can be an electronic apparatus capable of accessing and processing data, such as a desktop computer, a laptop computer, a digital TV, a PDA and/or a mobile phone.

The routing device 12 is used to provide connection routing paths for user end device 11. For data to be transmitted over the Internet, the routing device 12 determines the paths for transmitting them. Since the data are divided into multiple packets, where these packets should point to is determined by the routing device 12. Thus, when the user end device 11 uploads or receives data packets, the routing device 12 directs the data packets to specific routers or servers.

The protecting device 13 is used to protect safety of the packets coming from the routing device. In order to prevent the user end device 11 from receiving or transmitting abnormal packets, the protecting device 13 perform various kinds of information security measures on the packets. The contents of information security measures may include scanning and cleaning virus, blocking malicious packets and/or malicious connections.

In implementation of the present invention, the user end device 11 is first connected to the routing device 12. Then, the routing device 12 generates routing paths based on the profile corresponding to this user end device 11. When the user end device 11 uploads packets, the routing device 12 will direct the packets into a specific routing path using a policy-based routing (PBR) technique, so as to transmit the packets to the protecting device 13 that implements information security measures. The profile is established at the time the user end applied for an Internet connection or service and is written according to the PBR technique. It should be noted that the routing device 12 and the profile are not limited to the PBR technique, but can use any communication protocol that identifies a user end request and directs that request to a specific route. Moreover, the protecting device 13 may connect to other platform through the Internet 10 to implement security measures.

Figures 1, 2:
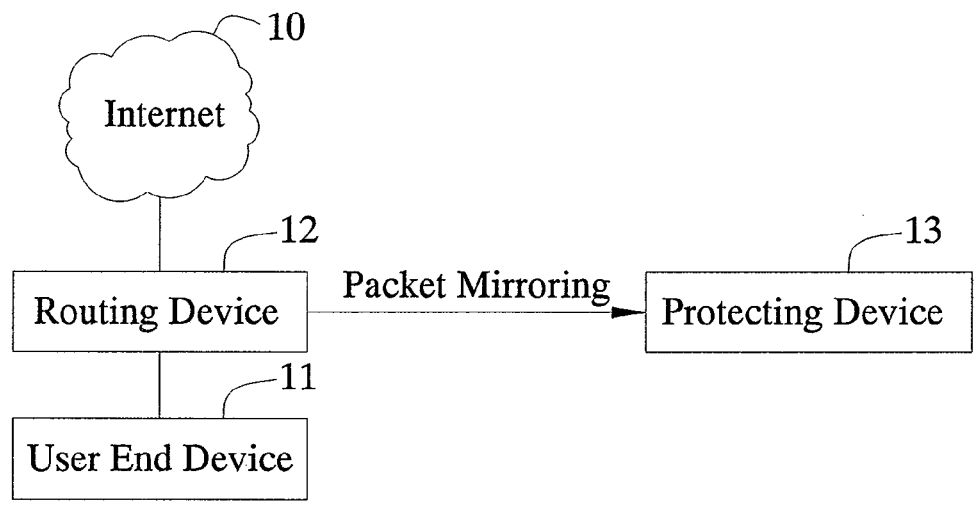

Referring to FIG. 1-2, the user end device 11 has already applied for certain information security services with its ISP. The user end device 11 is then able to receive/transmit data packets from/to the Internet 10 through the routing device 12 provided by the ISP. The routing device 12 can mirror the data packets of the user end device to the protecting device 13, and the protecting device 13 may implement specific information security features on the data packets. If the protecting device 13 finds that the webpage to which the user linked has inappropriate contents or the webpage is a malicious webpage, it signals the user end device 11 to stop this linking action thereby improves the security when users are surfing on internet.

Figures 1, 2, 3:
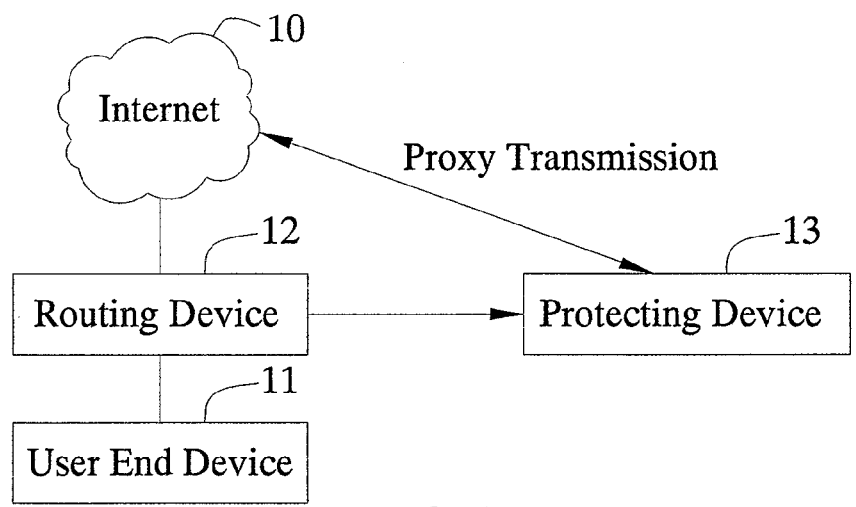

Referring to FIG. 1-3, in contrast to FIG. 1-2, the present architecture exploits the protecting device 13 to receive and transmit data packets on behalf of the user end device 11. For those users who did not apply for a information security service, their data packets are transmitted to the Internet 10 through the routing device 12, while for those who have applied for a information security service, the packets transmitted between the user end device 11 and the Internet 10 must go through the protecting device 13. Thus, the present invention uses the protecting device 13 to receive and transmit data packets on behalf of the user end device 11 and implement various information security measures on data packets, preventing any malicious packets or virus invasion from the user end device 11.

Referring to FIG. 1-4, the control system of the present invention includes the Internet 10, a user end device 11, a routing device 12 and a protecting device 13, a collective monitoring platform 14 and a service platform 15.

The collective monitoring platform 14 collects the logs regarding information security events generated by the protecting device 13, and standardizes event logs and analyzes event associations to detect any abnormal events. In addition, the collective monitoring platform 14 may store the results of associations and generate a list of events based on the result, which classifies the events into various levels. When a security event of certain level occurs, the maintenance staff at the ISP is informed.

The service platform 15 is used for extracting abnormal information and network status information. The service platform 15 may integrally display the abnormal information and network status information in a webpage interface for browsing and querying. When a certain event occurs, the service platform 15 may notify the user end device the above information, so the user can keep track of the statuses of network connection and information security.

In a preferred embodiment, first, the protecting device 13 performs information security measures on data packets from the user end device 11, and logs the generated events and sends the events to the collective monitoring platform 14. Then, the collective monitoring platform 14 standardizes the event logs and carries out association analysis. The collective monitoring platform 14 detects any abnormal information about the information security events and sends abnormal information to the service platform 15. Finally, the service platform 15 integrates the information about abnormality and network status into a report and displays it on a webpage interface. Thus, a user can link to this webpage interface to lookup or download the reports. If the service platform 15 detects abnormality, it may also actively inform the user.

In a preferred embodiment, the system may further include a network status detecting device for detecting user network status of the routing device so as to generate network status information. The service platform 15 may display the network status information on the webpage interface and/or send this information to the user end device. The network status information may include the status of a network connection apparatus, network connection, connection bandwidth and/or network utilization rate.

In another preferred embodiment, the user end device 11 can be connected to the service platform 15 through a Wide Area Network (WAN), a Virtual Private Network (VPN), a Local Area Network (LAN) and/or a wireless network. The protecting device 13 may provide services such as virus scanning, cleaning, malicious packet/connection blocking, invasion denial, invasion detection, content screening, webpage threat protection and/or virus protection.

In yet another preferred embodiment, abnormal information detected by the collective monitoring platform 14 may include abnormal connection of the virus-infected user end devices from inside and abnormal actions from outside, such as DOS/DDOS, worms or leak attacks.

Referring to FIG. 2, a block diagram depicting an actual implementation of the control system for integrated information security devices according to the present invention is shown. In this embodiment, the control system includes a user end device 20, a routing device 21, a protecting device 22, a collective monitoring platform 23, a maintenance platform 24, a service platform 25, a provision platform 26 and a network status detecting device 27. The collective monitoring platform 23 includes an event collecting device 231, an event analyzing device 232, an event storage device 233 and an event processing device 234. The service platform 25 includes a management device 251, an informing device 252 and a webpage device 253. The operations of the control system are as follow.

First, the user end device 20 applies for an integrated information security service with the ISP. The user end device 20 then connects to the routing device 21, and information security measures is performed on data packets using the protecting device 22 provided by the ISP. The protecting device 22 logs events generated during the information security service implementation and sends the events to the collective monitoring platform 23. Then, the event collecting device 231 collects the various event logs and standardizes them. Then, the event collecting device 231 sends the standardized event logs to the event analyzing device 232, which then carries out event association analysis based on predetermined rules to detect any abnormal information. The event analyzing device 232 stores abnormal information in the event storage device 233. In addition, the event analyzing device 232 may send the abnormal information to the event processing device 234, which generates an event list based on the result of association analysis and classifies the events into different levels. The event processing device 234 sends notifying messages to the maintenance platform 24, so that maintenance staff may act accordingly.

Moreover, the event analyzing device 232 sends abnormal information to the service platform 25. The alarming device 252 also receives network status information provided by the network status detecting device 27 and sends the abnormal information as well as the network status information to the webpage device 253, which displays said information on a webpage interface. On the other hand, the alarming device 252 obtains information regarding user end devices from the management device 251 and makes comparison, and then sends the abnormal information as well as the network status information to the appropriate user end device 20.

In a preferred embodiment, the informing device may inform the user end device 20 through electronic mails (e-mails) or Short Message Service (SMS) messages.

In another preferred embodiment, the provision platform 26 is used for providing user information to the collective monitoring platform 23 and the service platform 25. When the user applies for information security services, user's data must be stored in the provision platform 26. When the event analyzing device 232 in the collective monitoring platform 23 performs association analysis, it has to compare the event logs and the user information in order to associate a certain information security event with a corresponding user. Therefore, the event analyzing device 232 needs to obtain user information through the provision platform 26. Also, the alarming device 252 needs to perform the above comparison, thus it also needs to obtain user information through the provision platform 26, so that information security information can be sent to the correct user.

Referring to FIG. 3, a flowchart illustrating a protection method for integrated information security service according to the present invention is shown. The steps of implementing the method are described below.

In step S30, allowing the protecting device to perform information security measures on data packets of the user end device, and generate and send an event log to the collective monitoring platform. The user end device may be a desktop computer, a laptop computer, a PDA and/or a mobile phone. Then, proceed to step S31.

In step S31, allowing the collective monitoring platform to standardize the event log and carry out association analysis. Then, proceed to step S32.

In step S32, allowing the collective monitoring platform to detect abnormal information, and send abnormal information, if there is any, to the service platform. Then, proceed to step S33.

In step S33, allowing the service platform to display the abnormal information on a webpage interface, and also send the abnormal information to the user end device.

In a preferred embodiment, the user end device may be connected to the service platform through a WAN, a VPN, a LAN and/or a wireless network.

In another preferred embodiment, the protecting device may provide services such as virus scanning, cleaning, malicious packet/connection blocking, invasion denial, invasion detection, content screening, webpage threat protection and/or virus protection.

Figures 1, 2, 3, 4:
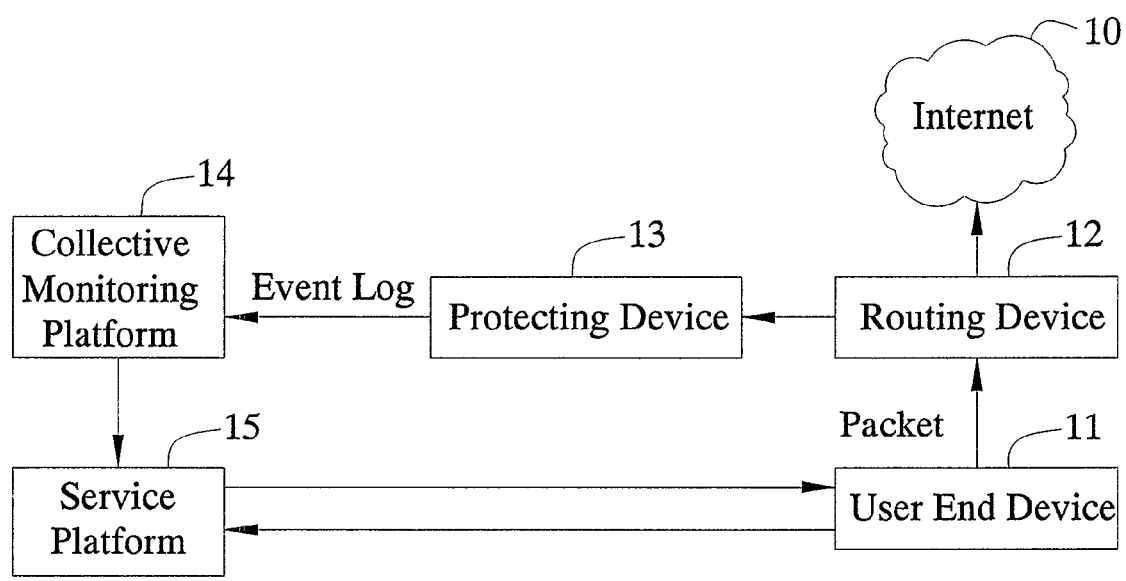
Figure 2:
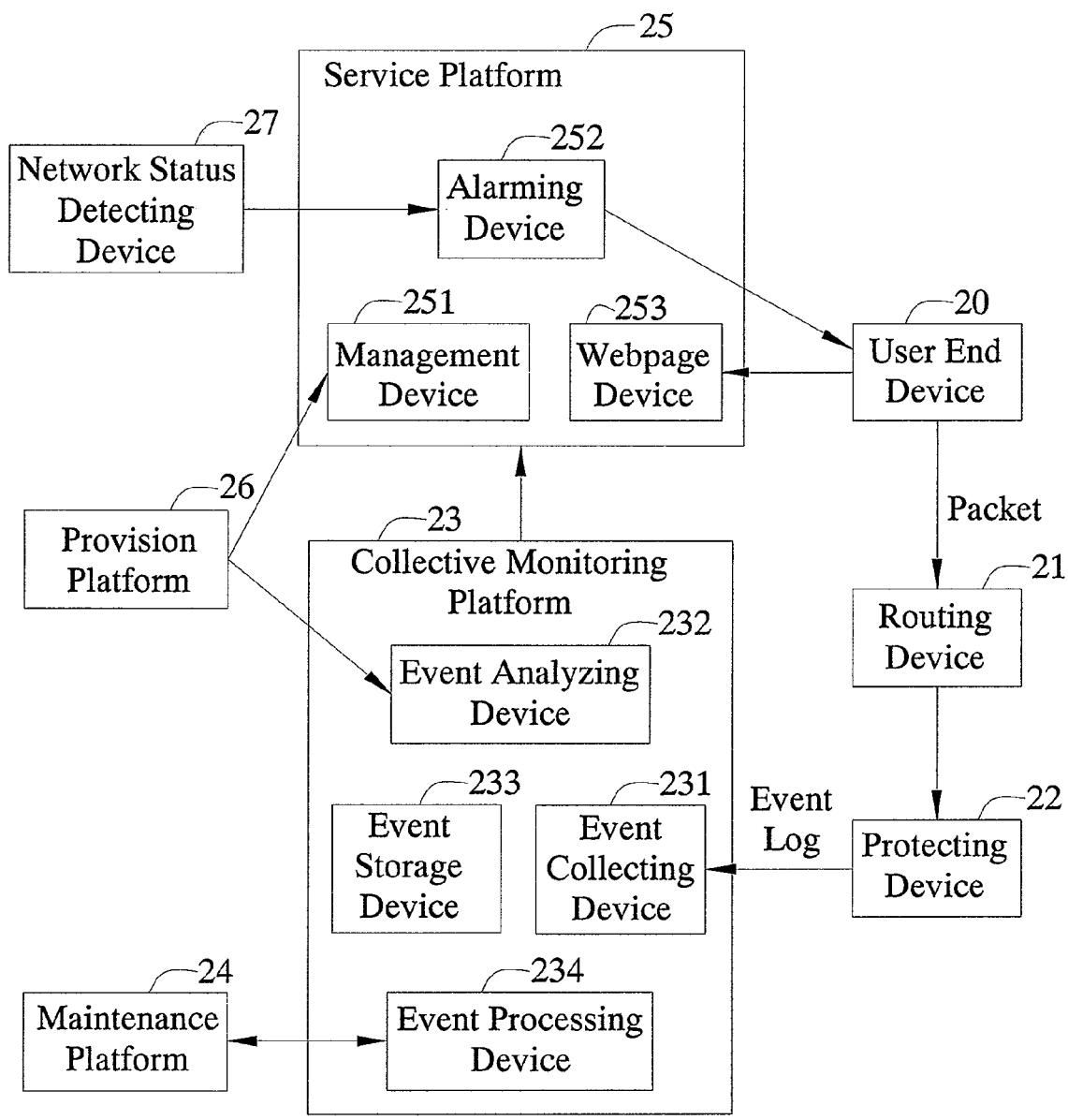
Figure 3:
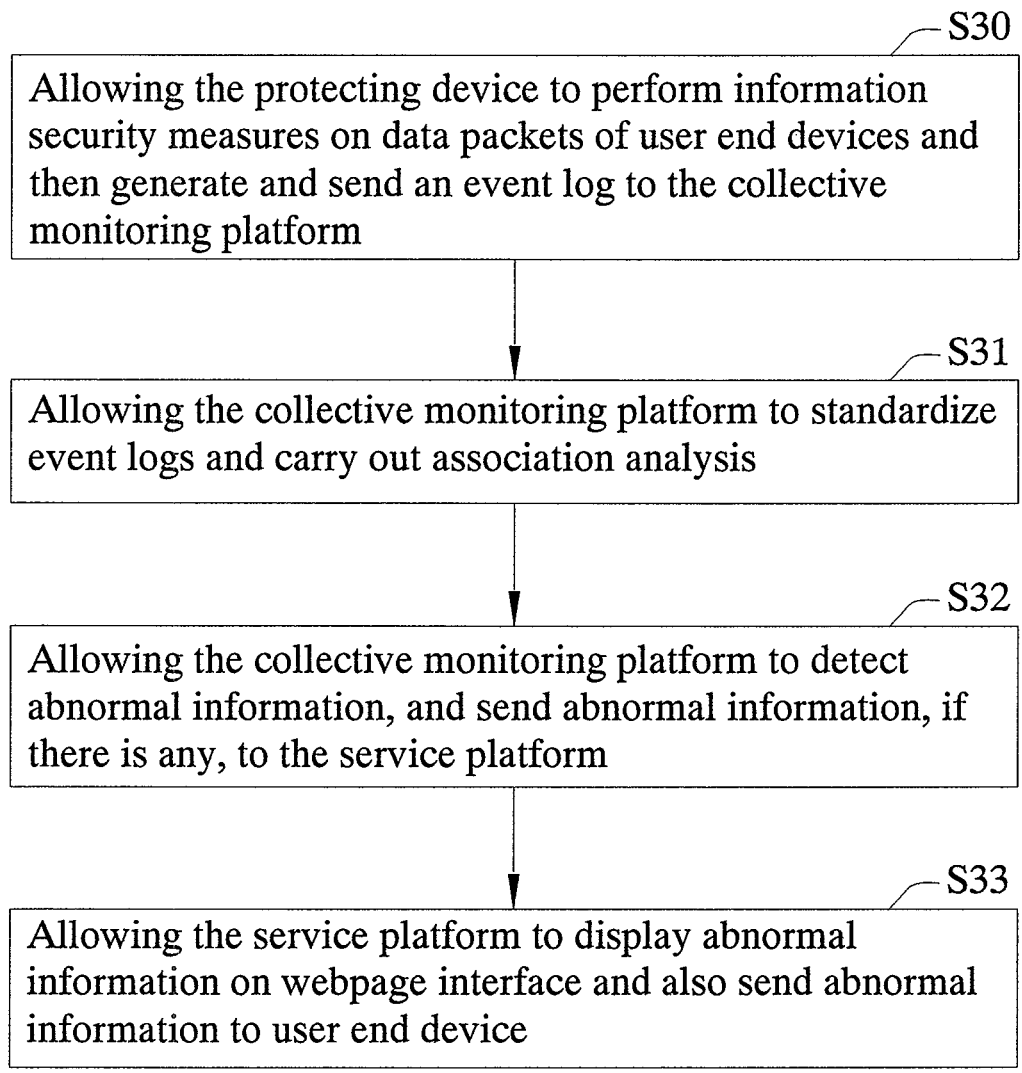
Figures 1, 4:
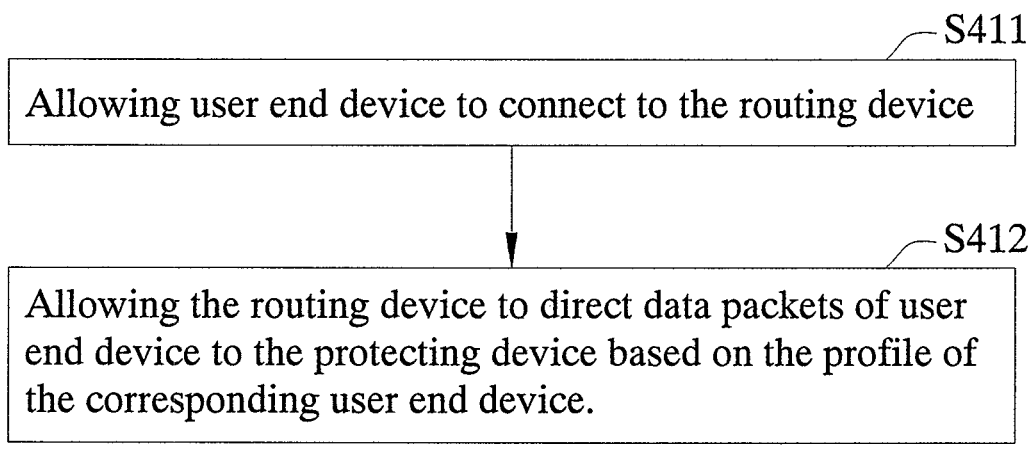
Figures 2, 4:
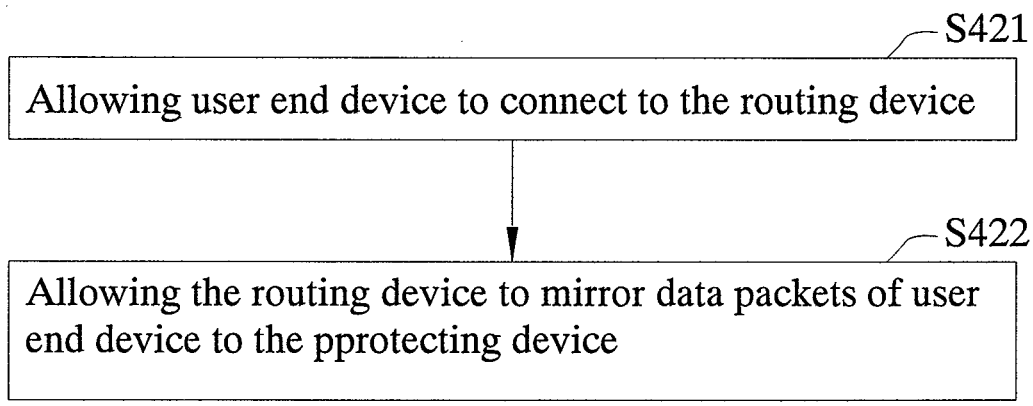
Figures 3, 4:
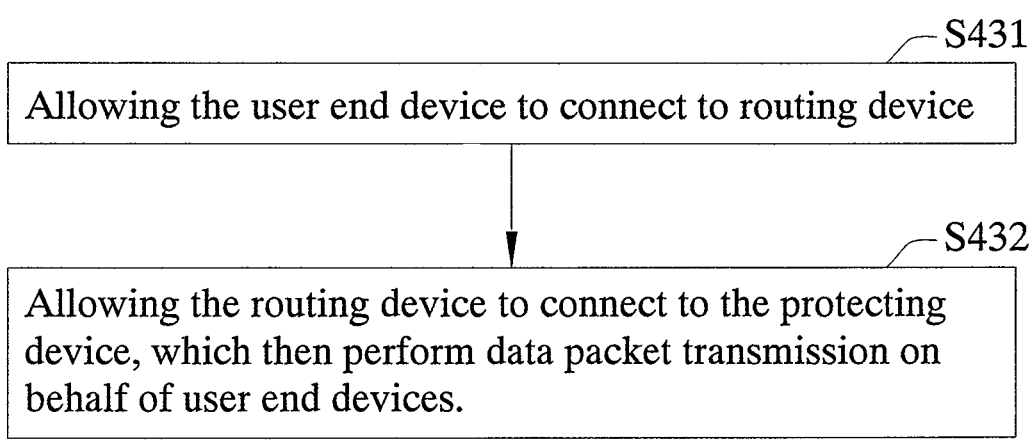

FIGS. 4-1 to 4-3 are flowcharts illustrating actual implementations of the protection method for integrated information security service according to the present invention. The information security protection method has at least three aspects. FIG. 4-1 shows the first aspect including the steps as follow.

In step S411, allowing the user end device to connect to the routing device. Then, proceed to step S412.

In step S412, allowing the routing device to direct data packets of the user end device to a protecting device based on a profile of the corresponding user end device.

FIG. 4-2 shows the second aspect that includes the following steps.

In step S421, allowing the user end device to connect to the routing device. Then, proceed to step S422.

In step S422, allowing the routing device to mirror data packets of the user end device to the protecting device.

FIG. 4-3 shows the third aspect that includes the following steps.

In step S431, allowing the user end device to connect to the routing device. Then, proceed to step S432.

In step S432, allowing the routing device to connect to the protecting device, which then performs data packet transmission on behalf of the user end device.

With the above protection method, the routing paths for data packets are determined by the profile of a specific user end device, and data packets can be directed into the protecting device for data protection processes. Network viruses and malicious attack can be successfully blocked at the ISP side, while increasing utilization rate of outbound network bandwidth. Furthermore, with the information security services provided by the ISP, users do not need to install large amount of data protecting devices, significantly reducing cost for installation and maintenance.

Figure 5:
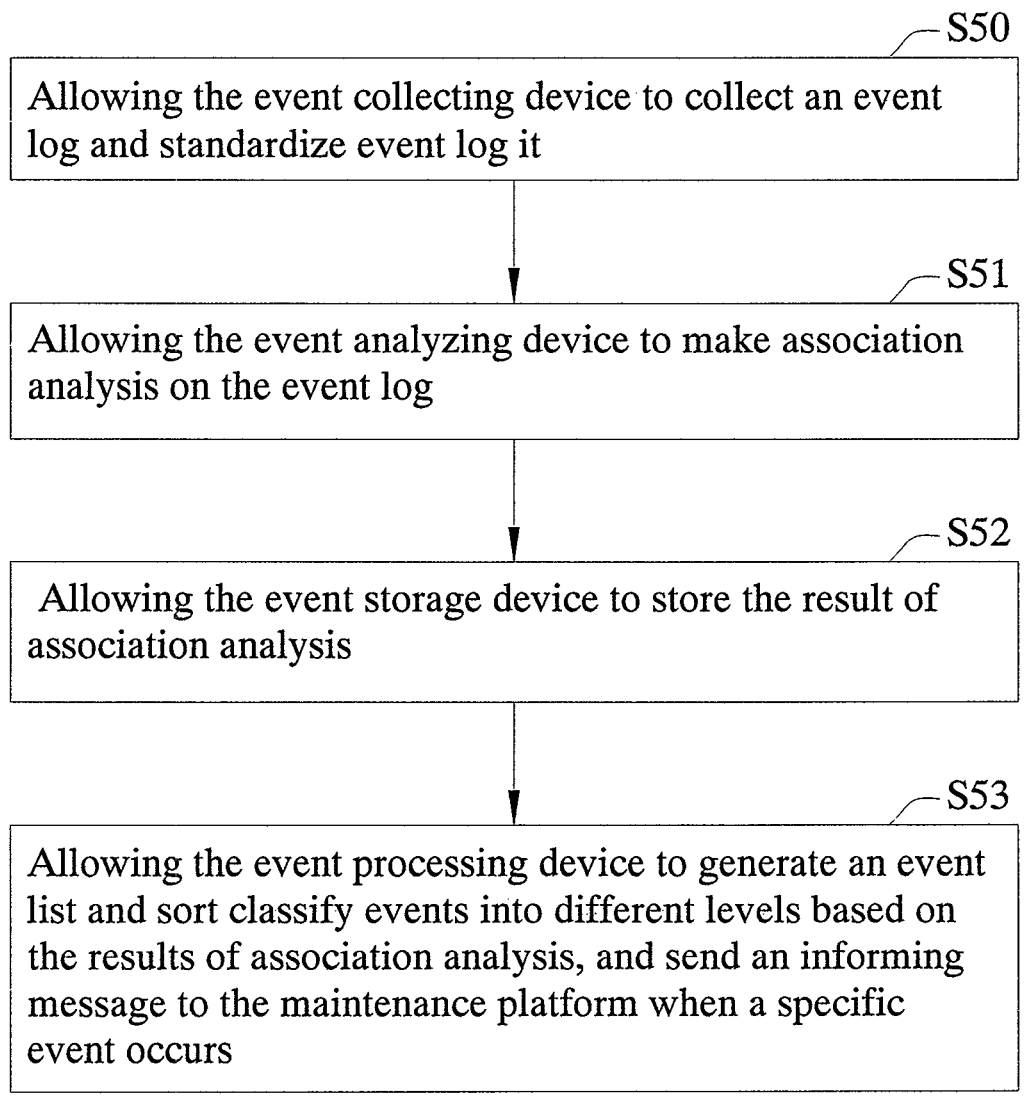
FIG. 5 is a flowchart illustrating steps of a collective monitoring platform in the protection method for integrated information security services according to the present invention.

Referring to FIG. 5, a flowchart illustrating an actual implementation of the collective monitoring platform in the protection method for integrated information security services according to the present invention is shown. The specific operations of which are shown below.

In step S50, allowing the event collecting device to collect an event log and standardize the event log. Then, proceed to step S51.

In step S51, allowing the event analyzing device to make association analysis on the event log. Then, proceed to step S52.

In step S52, allowing the event storage device to store the result of association analysis. Then, proceed to step S53.

In step S53, allowing the event processing device to generate an event list and classify the events into different levels based on the result of association analysis, and send an informing message to the maintenance platform when a specific event occurs. In addition, the event processing device can also provide functions for managing processes of the information security events.

In a preferred embodiment, the event analysis device can also make association analysis on the event log based on predetermined rules.

In a preferred embodiment, when a specific event happens, the event processing device sends an informing message to the maintenance platform, allowing maintenance staff to notify the client and/or carry out maintenance operations.

Figure 6:
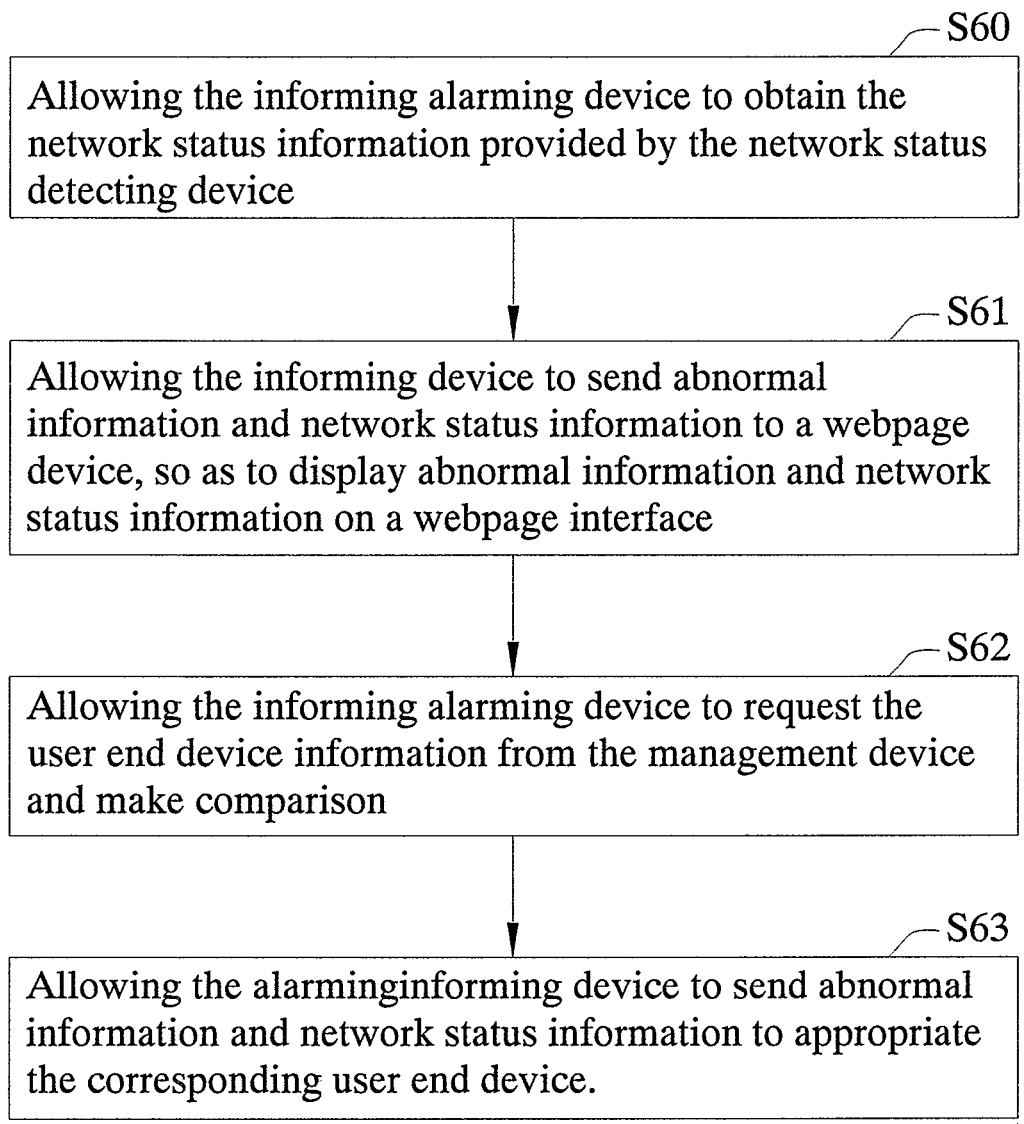
FIG. 6 is a flowchart illustrating steps of a service platform in the protection method for integrated information security services according to the present invention.

Referring to FIG. 6, a flowchart illustrating an actual implementation of the service platform in the protection method for integrated information security services according to the present invention is shown. The specific operations of which are shown below.

In step S60, allowing the alarming device to obtain network status information provided by the network status detecting device. Then, proceed to step S61.

In step S61, allowing the alarming device to send the abnormal information and the network status information to the webpage device, so as to display the abnormal information and the network status information on the webpage interface. Then, proceed to step S62.

In step S62, allowing the alarming device to request user end device information from the management device and make comparison. Then, proceed to step S63.

In step S63, allowing the alarming device to send the abnormal information and the network status information to the corresponding user end device.

From the above, the present invention classifies the information security services subscribed by the users into levels, and provides protection services. The present invention collects and sends information security event logs generated from the services subscribed by the users to the back-end service platform for classifying and association analysis, then further integrates the users' network status to generate an integrated report containing network information and information security information for querying. The service platform may also actively send e-mails or SMS messages to inform the users. Therefore, the users can keep track of the information security events or network status, greatly improving the convenience of network maintenance at the client sides.

In summary, the monitoring platform and method for integrated network status information and information security information according to the present invention has the following advantages.

First, convenience of network maintenance at client sides is increased. Since the present invention provides easy-to-comprehend integrated report by standardizing event logs for information security events and analyzing their associations, ordinary users may easily understand the contents without the help of technical staff.

Second, the cost for installing data protection mechanisms is reduced. In prior art, companies not only have to spend large amount of money to purchase and install information security devices, but also need to hire technical staff to manage and maintain the devices. Since the ISP can perform information security measures as well as integrated report on network and information security information for users, users no longer need to install data protection apparatuses themselves (e.g. firewall or antivirus software).

The above embodiments are only used to illustrate the principles of the present invention, and they should not be construed as to limit the present invention in any way. The above embodiments can be modified by those with ordinary skills in the art without departing from the scope of the present invention as defined in the following appended claims.

What is claimed is:

1. A control system for integrated information security services, comprising:
    a user end device;
    a routing device for providing connection routing paths for the user end device;
    a protecting device for performing an information security service on data packets from the routing device and generating an event log based on results of the information security service;
    a collective monitoring platform for extracting and collecting the event log, and performing association analysis on the event log to detect abnormal information; and
    a service platform for extracting the abnormal information and network status information,
    wherein the service platform displays the abnormal information and the network status information on a webpage interface, and sends the abnormal information and the network status information to the user end device, so as for and the protecting device implements specific information security features on the data packets, the protecting devices signal the user end device to stop this linking action if the protecting device finds that the webpage to which the user end device linked has inappropriate contents or the webpage is a malicious webpage.

2. The control system of claim 1, further comprising a network status detecting device for detecting user network status of the routing device and generating the network status information, wherein the service platform displays the network status information on the webpage interface and sends the network status information to the user end device.

3. The control system of claim 1, wherein the routing device directs data packets of the user end device to a specific routing path based on a profile of the corresponding user end device, and the protecting device performs the information security service on the received data packets.

4. The control system of claim 1, wherein the routing device mirrors the data packets of the user end device to the protecting device, which performs the information security service for the data packets.

5. The control system of claim 1, wherein the protecting device receives or transmits the data packets on behalf of the user end device.

6. The control system of claim 1, wherein the collective monitoring platform further comprises:
   an event collecting device for collecting the event log and standardizing the event log;
   an event analyzing device for making the association analysis on the standardized event log, and providing functionalities for system functions setup, user setup, association analysis rules setup and interfacing with a maintenance platform;
   an event storage device for storing the event log and result of the association analysis; and
   an event processing device for forming a list of events based on the association analysis and sorting the events into levels.

7. The control system of claim 6, wherein the event analyzing device makes association analysis on the event log based on predetermined analysis rules.

8. The control system of claim 6, wherein the event processing device sends an informing message to the maintenance platform for carrying out maintenance operations when a specific event occurs.

9. The control system of claim 6, wherein the event processing device is capable of managing procedures of information security events.

10. The control system of claim 1, wherein the service platform further comprises:
    a management device for managing information of the user end device;
    an informing device for sending the abnormal information to the user end device; and
    a webpage device for displaying the abnormal information on the webpage interface.

11. The control system of claim 10, wherein the informing device informs the user end device by electronic mails or Short Message Service (SMS) messages.

12. The control system of claim 1, further comprising a provision platform that provides user information to the collective monitoring platform and the service platform.

13. The control system of claim 1, wherein the user end device is connected to the service platform through at least one of a Wide Area Network (WAN), a Virtual Private Network (VPN), a Local Area Network (LAN) and a wireless network.

14. The control system of claim 1, wherein the user end device is one selected from the group consisting of a workstation, desktop computer, a laptop computer, a digital television, a Personal Digital Assistant (PDA), and a mobile phone.

15. The control system of claim 1, wherein the protecting device provides functions of virus scanning, cleaning, malicious packets/connection blocking, invasion denial, invasion detection, content screening, webpage threat protection and or virus protection.

16. A protection method for integrated information security services, comprising the following steps:

(1) allowing a protecting device for performing a information security service on data packets of a user end device and generating an event log based on results of the information security service;
(2) allowing a collective monitoring platform to standardize the event log, and to perform association analysis on the event log;
(3) allowing the collective monitoring platform to detect abnormal information and to send the abnormal information to a service platform; and
(4) allowing the service platform to display the abnormal information and network status information on a webpage interface, and to send the abnormal information and the network status information to the user end device, wherein the protecting device implements specific information security features on the data packets, so as for the protecting device to signal the user end device to stop this linking action if the protecting device finds that the webpage to which the user end device is linked has inappropriate contents or the webpage is a malicious webpage.

17. The protection method of claim 16, wherein the step (1) further comprises the following steps:
    allowing the user end device to be connected to a routing device; and
    allowing the routing device to direct the data packets of the user end device to the protecting device based on a profile of the corresponding user end device.

18. The protection method of claim 16, wherein the step (1) further comprises the following steps:
    allowing the user end device to be connected to a routing device; and
    allowing the routing device to mirror the data packets corresponding to the user end device to the protecting device.

19. The protection method of claim 16, wherein the step (1) further comprises the following steps:
    allowing the user end device to be connected to a routing device; and
    allowing the routing device to connect the protecting device, so as for the protecting device to perform data packet transmission on behalf of the user end device.

20. The protection method of claim 16, wherein the step (2) further comprises the following steps:
    (2-1) allowing an event collecting device to collect and standardize the event log; and
    (2-2) allowing an event analyzing device to make the association analysis on the event log.

21. The protection method of claim 20, further comprising the following steps:
    (2-3) allowing an event storage device to store the event log and result of the association analysis; and
    (2-4) allowing an event processing device to make a list of events based on the association analysis, classify the events into levels, and send informing messages to a maintenance platform when a specific event occurs.

22. The protection method of claim 16, where the step (4) further comprises the following steps:
    (4-1) allowing an alarming device to obtain the network status information provided by a network status detecting device;
    (4-2) allowing the alarming device to send the network status information and the abnormal information to a webpage device, so as to display the network status information and the abnormal information on the webpage interface;

(4-3) allowing the alarming device to obtain information of the user end device from a management device and carry out comparison; and (4-4) allowing the alarming device to send the network status information and the abnormal information to the user end device.

23. The protection method of claim 16, wherein the user end device is one selected from the group consisting of a workstation, desktop computer, a laptop computer, a digital television, a Personal Digital Assistant (PDA), and a mobile phone.

24. The protection method of claim 16, wherein the user end device is connected to the service platform through at least one of a Wide Area Network (WAN), a Virtual Private Network (VPN), a Local Area Network (LAN) and a wireless network.

25. The protection method of claim 16, wherein the protecting device provides functions of scanning and cleaning virus, malicious packet/connection blocking, invasion denial, invasion detection, content screening, webpage threat protection and/or virus protection.

* * * * *